US010875659B2

(12) United States Patent
Valleroy et al.

(10) Patent No.: US 10,875,659 B2
(45) Date of Patent: Dec. 29, 2020

(54) ACOUSTIC ATTENUATION STRUCTURE WITH A PLURALITY OF ATTENUATION DEGREES FOR A PROPULSION ASSEMBLY OF AN AIRCRAFT

(71) Applicant: Safran Nacelles, Gonfreville l'orcher (FR)

(72) Inventors: Laurent Georges Valleroy, Gonfreville l'orcher (FR); Marc Versaevel, Gonfreville l'orcher (FR); Bertrand Desjoyeaux, Gonfreville l'orcher (FR); Patrick Gonidec, Gonfreville l'orcher (FR)

(73) Assignee: Safran Nacelles, Gonfreville l'Orcher (FR)

( * ) Notice: Subject to any disclaimer, the term of this patent is extended or adjusted under 35 U.S.C. 154(b) by 450 days.

(21) Appl. No.: 15/884,507

(22) Filed: Jan. 31, 2018

(65) Prior Publication Data
US 2018/0148187 A1  May 31, 2018

Related U.S. Application Data

(63) Continuation of application No. PCT/FR2016/051970, filed on Jul. 28, 2016.

(30) Foreign Application Priority Data

Jul. 31, 2015 (FR) ...................................... 15 57431

(51) Int. Cl.
*F02K 1/34* (2006.01)
*G10K 11/168* (2006.01)
(Continued)

(52) U.S. Cl.
CPC ............. *B64D 33/06* (2013.01); *B64D 27/16* (2013.01); *B64D 29/00* (2013.01); *B64D 29/06* (2013.01);
(Continued)

(58) Field of Classification Search
CPC ........ B64D 29/00; B64D 29/06; B64D 33/06; B64D 27/16; F02K 1/72; F02K 1/827;
(Continued)

(56) References Cited

U.S. PATENT DOCUMENTS 5,041,323 A * 8/1991 Rose ......................... B32B 3/12
428/116
2001/0010148 A1 * 8/2001 Michel ...................... F02K 1/72
60/226.1
(Continued)

FOREIGN PATENT DOCUMENTS

EP   0702141   3/1996
EP   1103462   5/2001
(Continued)

OTHER PUBLICATIONS

International Search Report for International Application PCT/FR2016/051970, dated Nov. 16, 2016.

*Primary Examiner* — Forrest M Phillips
(74) *Attorney, Agent, or Firm* — Burris Law, PLLC (57) ABSTRACT

The present disclosure particularly relates to an acoustic attenuation structure for a propulsion assembly of an aircraft. The acoustic attenuation structure includes an acoustically reflective wall and a sandwich panel. The sandwich panel includes a honeycomb structure surrounded by two acoustically porous skins, a rear skin and a skin. The acoustically reflective wall and the sandwich panel are arranged in such a way as to be separated by a layer of air.

19 Claims, 8 Drawing Sheets

(51) Int. Cl.
  *B64D 29/06*  (2006.01)
  *F02K 1/82*  (2006.01)
  *F02K 1/72*  (2006.01)
  *B64D 27/16*  (2006.01)
  *B64D 29/00*  (2006.01)

(52) U.S. Cl.
  CPC ................ *F02K 1/72* (2013.01); *F02K 1/827* (2013.01); *G10K 11/168* (2013.01); *F05D 2260/96* (2013.01); *Y02T 50/60* (2013.01)

(58) Field of Classification Search
  CPC .. G10K 11/168; F05D 2260/96; Y02T 50/671
  USPC ........................................................ 181/290
  See application file for complete search history.

(56) References Cited

U.S. PATENT DOCUMENTS

2009/0121078 A1* 5/2009 Marche ................ B64D 33/04
  244/110 B
2020/0182194 A1* 6/2020 Journade ................ F02K 1/625

FOREIGN PATENT DOCUMENTS

| | | | | |
|---|---|---|---|---|
| EP | 1482478 | | 12/2004 | |
| EP | 1482478 A2 * | | 12/2004 | ........... G10K 11/175 |
| EP | 2484591 A2 * | | 8/2012 | ............ B64D 33/06 |
| EP | 3434596 A1 * | | 1/2019 | ............ B64D 33/02 |
| WO | 1992/000183 | | 1/1992 | |

\* cited by examiner

United States Patent US 10,875,659 B2

ACOUSTIC ATTENUATION STRUCTURE WITH A PLURALITY OF ATTENUATION DEGREES FOR A PROPULSION ASSEMBLY OF AN AIRCRAFT

CROSS-REFERENCE TO RELATED APPLICATIONS

This application is a continuation of International Application No. PCT/FR2016/051970, filed on Jul. 28, 2016, which claims priority to and the benefit of FR 15/57431 filed on Jul. 31, 2015. The disclosures of the above applications are incorporated herein by reference.

FIELD

The present disclosure relates to the field of the acoustic attenuation for aircraft propulsion unit, formed by a turbojet engine (in particular a bypass turbojet engine) equipped with a nacelle, in which the propulsion unit can possibly include a motor mast/pylon.

BACKGROUND

The statements in this section merely provide background information related to the present disclosure and may not constitute prior art.

In an aircraft propulsion unit, the acoustic attenuation is generally carried out by means of acoustic attenuation panels. Such panels may take the shape of a sandwich structure, including an alveolar core framed between two skins, one is solid and the other is perforated so as to be acoustically porous. The perforated skin, generally called acoustic skin, is intended to be in contact with the cold air flow crossing the nacelle and/or the hot gas flow ejected by the turbojet engine.

There are known acoustic attenuation panels with one degree of freedom of the acoustic waves, known as SDOF acoustic panels (for "Single Degree of Freedom"). Such panels take the shape of a sandwich structure as described above.

There are also known acoustic attenuation panels with two degrees of freedom, known as the 2DOF acoustic panels (or DDOF for "Double Degree of Freedom"). Unlike SDOF type panels, the DDOF type panels comprise an alveolar structure with two stages, these stages being separated by an acoustically porous wall commonly called septum. As for the previously described panels, this alveolar structure is sandwiched between an acoustically reflective skin and an acoustically porous skin. The DDOF type panels have the advantage of attenuating the acoustic waves over a wider frequency band than a SDOF type panel.

Generally, the height of the alveolar structure (and thus the height of the cavities that it includes) and the porosity of the acoustic skin and, where appropriate, of the septum are optimized so as to maximize the acoustic attenuation and to target the right range of sound frequencies.

Moreover, the more the acoustically processed surface within a propulsion unit (in particular in a nacelle) is important, the better the overall performance of the acoustic attenuation is. Thus, the manufacturers are continuously working to increase the acoustically processed surface.

Figure 1A:
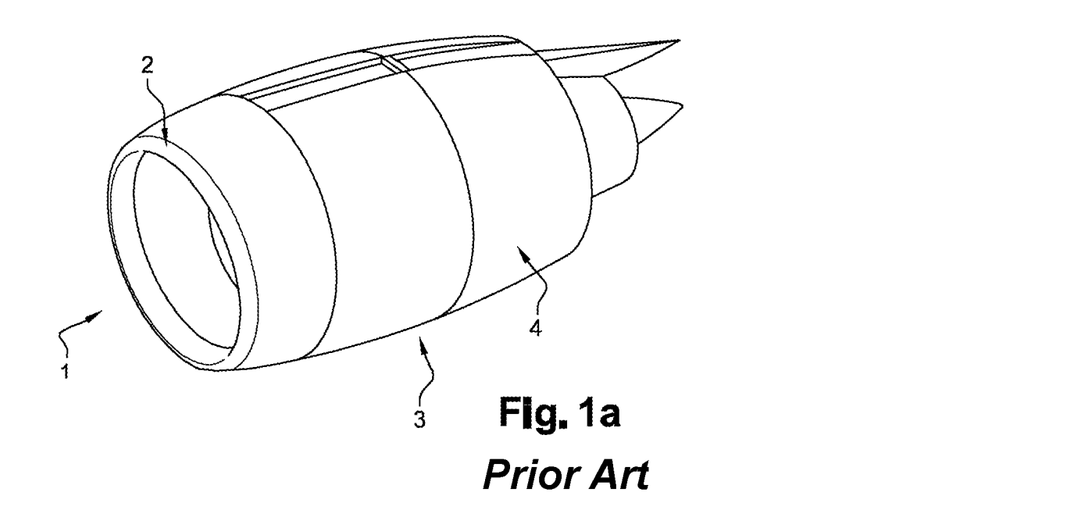
FIG. 1*a* shows an aircraft propulsion unit in a direct jet configuration according to the prior art.
Figure 1B:
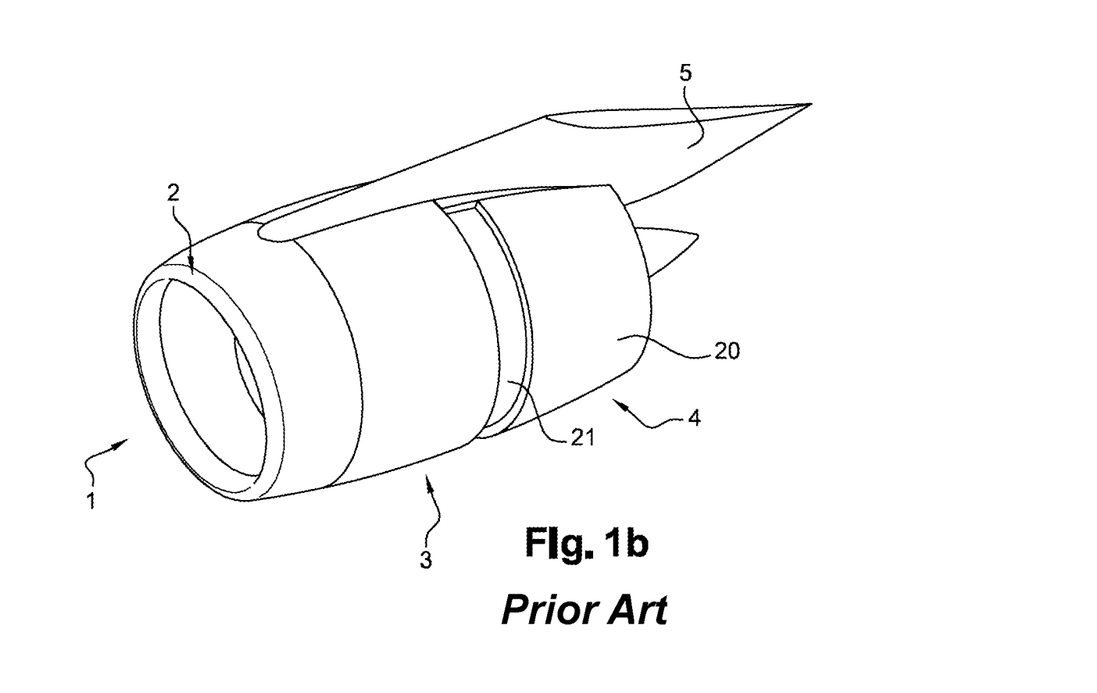
FIG. 1*b* shows an aircraft propulsion unit in a reverse jet configuration according to the prior art.

FIGS. 1a and 1b show a view of a propulsion unit including a nacelle 1 surrounding a bypass turbojet engine, the assembly being secured to a drive mast 5 (shown only in FIG. 1b). Conventionally, the nacelle 1 includes an air inlet 2, a middle section 3 as well as a rear section 4. FIG. 1a shows the nacelle 1 in the "direct jet" configuration, that is to say with the thrust reverser system in the retracted position, while FIG. 1b shows the nacelle in the "reverse jet" configuration, that is to say with the thrust reverser system in the deployed position. Thus it is shown in FIG. 1b that a movable cowl 20 of the rear section 4 is in the retracted position, exposing a set of cascade vanes 21.

Figure 2A:
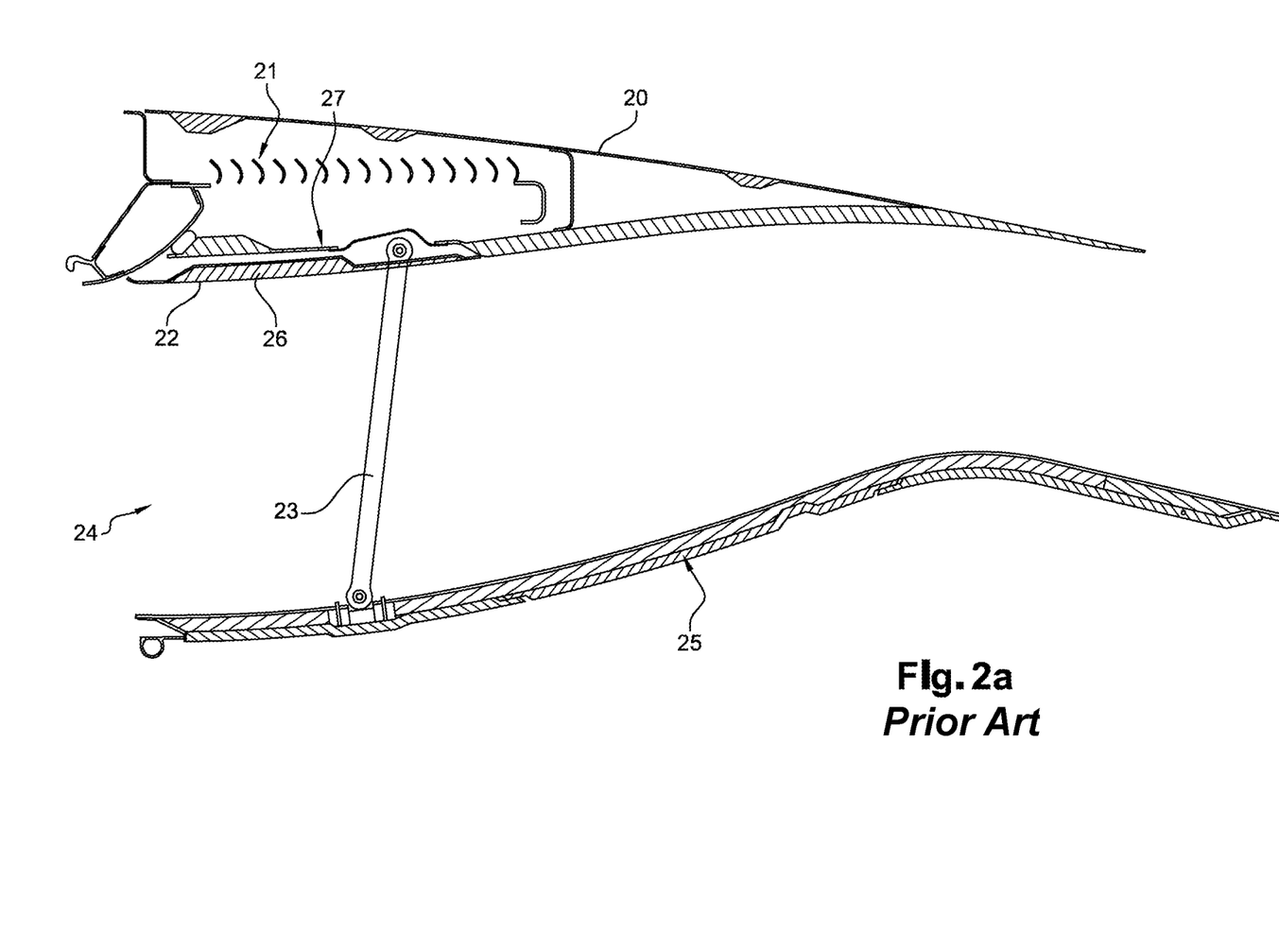
FIG. 2*a* shows a sectional view of a rear section of bypass turbojet engine nacelle in a direct jet configuration according to the prior art.
Figure 2B:
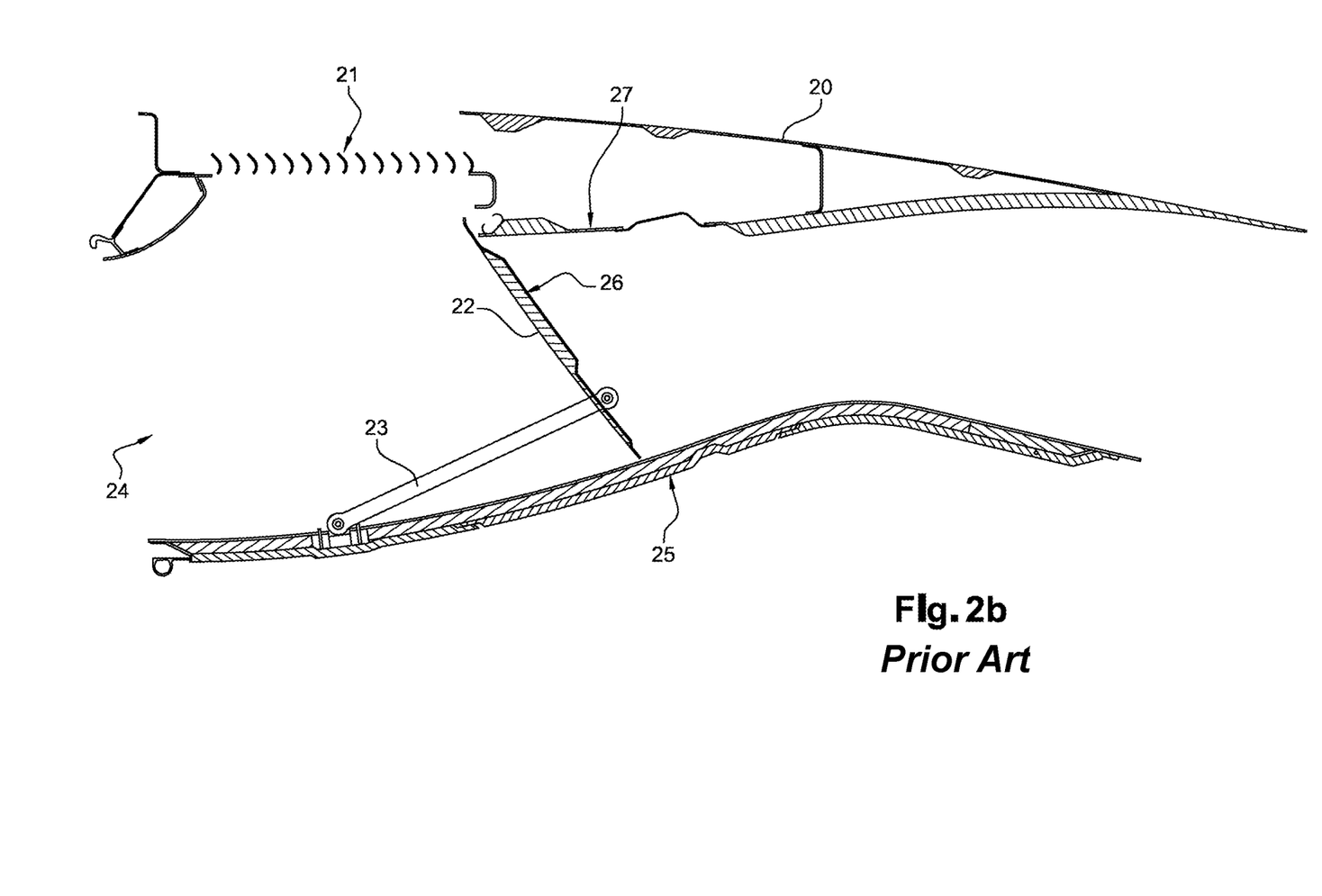
FIG. 2*b* show a sectional view of a rear section of bypass turbojet engine nacelle in a reverse jet configuration according to the prior art.

FIGS. 2a and 2b show a section of the rear section 4 of the nacelle 1, respectively, when the thrust reverser system is in the retracted position (or direct jet mode) and in the deployed position (or reverse jet mode).

The thrust reverser system comprises a movable cowl 20, which forms the outer surface of the rear section 4 of the nacelle. The thrust reverser system further comprises cascade vanes 21 and the blocking flaps 22, movable in rotation, and associated with the connecting rods 23. The thrust reverser system includes actuators (not shown), in particular electromechanical actuators, allowing sliding the movable cowl between a retracted position (FIG. 2a) and a deployed position (FIG. 2b) and vice versa. This translation is performed along a longitudinal axis of the nacelle, corresponding to the longitudinal axis of the motor.

When the thrust reverser system is in the retracted position (FIG. 2a):

the movable cowl 20 is in the retracted position corresponding to a forward position in which it ensures the aerodynamic continuity with the middle section of the nacelle; and the blocking flaps 22 are in the retracted position, in which position they are aligned with the inner surface of the movable cowl 20, and housed in a shroud 27 of the movable cowl 20.

When the thrust reverser system is in the deployed position (FIG. 2b):

the movable cowl is in the deployed position, corresponding to a retracted position, in which it uncovers the cascade vanes 21; and the blocking flaps 22 are in the deployed position, in which position they obstruct at least partially the cold flow path 24.

In this configuration, the action of the blocking flaps 22 and of the cascade vanes 21 allows redirecting the cold flow outside the nacelle, forwardly in order to create a counter-thrust. The switch to the deployed position of the blocking flaps 22 is in the example obtained by the action of connecting rods 23 attached to an inner fixed structure 25 of the nacelle.

Figure 3A:
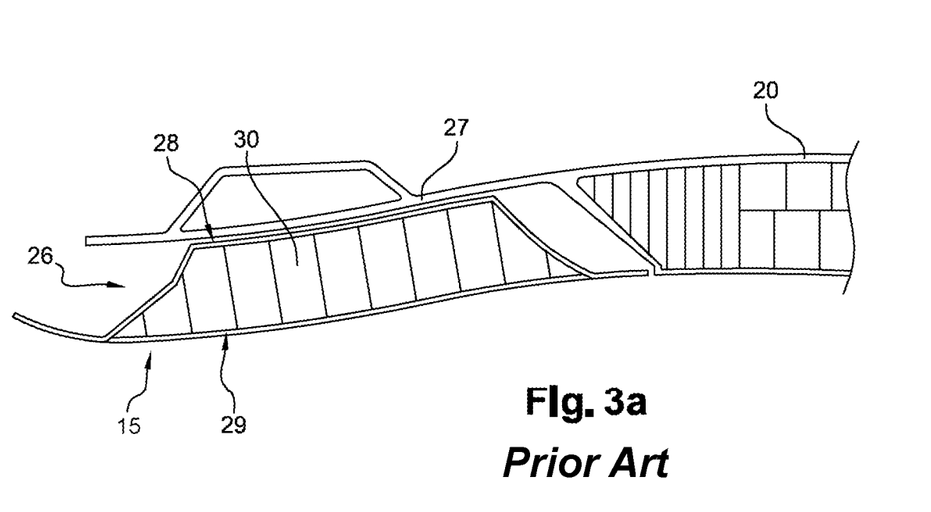
FIG. 3*a* shows a thrust reverser blocking flap provided with a SDOF acoustic attenuation panel according to the prior art.
Figure 3B:
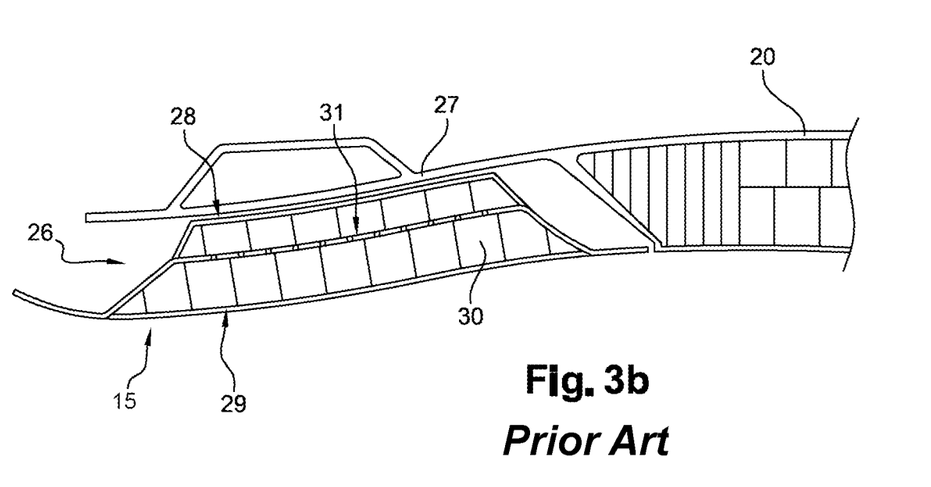
FIG. 3*b* shows a thrust reverser blocking flap provided with a DDOF acoustic attenuation panel according to the prior art.

It is known to provide an acoustic attenuation panel 26 on the blocking flaps. Examples of acoustically processed blocking flaps are shown in FIGS. 3a and 3b, which show a longitudinal sectional view of a blocking flap. FIGS. 3a and 3b thus show a blocking flap 15 equipped with an acoustic attenuation panel 26, respectively with single degree of freedom and double degree of freedom.

In FIG. 3a, it is possible to see that the acoustic attenuation panel 26 with one degree of freedom includes a solid rear skin 28 and a front skin 29, these two skins framing an alveolar core 30. The front skin 29 is multi-perforated, and thus acoustically porous. The front skin 29 forms the outer surface of the blocking flap 15.

The quest for maximum reduction of noise of the aircraft propulsion units has led manufacturers to consider sound attenuator with double degree of freedom.

Thus, in FIG. 3b, the acoustic attenuation panel 26, with two degrees of freedom, is formed by a solid skin 28 and a perforated skin 29 framing an alveolar core 30. However, the alveolar structure includes two stages separated by a septum 31. Thus, this allows improving the acoustic attenuation performance particularly in intermediate and high sound frequencies, but leads to expensive and heavy acoustic panels.

In addition, the acoustic attenuation panel 26 being installed in the shroud 27, said shroud must be sized to accommodate the blocking flaps (and therefore the acoustic attenuation panel 26) when the blocking flaps are in the retracted position. The bulk of the acoustic attenuation panel thus constitutes a drawback because it requires in this example to increase the dimensions of the shroud, and in the end of the nacelle.

SUMMARY

The present disclosure provides an acoustic attenuation structure with at least two degrees of freedom, in particular adaptable to a thrust reverser blocking flap, which allows saving space and also mass.

To this end, the present disclosure relates to an acoustic attenuation structure for aircraft propulsion unit, comprising an acoustically reflective wall and a sandwich panel, the sandwich panel including an alveolar structure framed by two acoustically porous skins, a rear skin and a front skin, the acoustically reflective wall and the sandwich panel being arranged so as to be separated by a non-circulating air layer.

Thus, the acoustic attenuation structure in accordance with the present disclosure allows obtaining an acoustic attenuation equivalent to that obtained with the known DDOF type acoustic attenuation panels. The present disclosure provides relative to these known panels a reduction in weight and simplicity of manufacture, since one alveolar single-stage structure is enough. In addition, the acoustic attenuation structure in accordance with the present disclosure can be carried out on members movable relative to each other, such as for example a thrust reverser blocking flap and a shroud on which this flap is hinged.

Non-circulating air layer means a layer of air in which air is substantially static when the blocking flaps are in the retracted position.

Indeed, the non-circulating air layer allows improving the acoustic attenuation of the acoustic attenuation structure and maintaining the aerodynamic performances of the propulsion unit. Indeed, if the air circulated in the air layer, the aerodynamic performances of the propulsion unit would be decreased.

According to one aspect of the present disclosure, the acoustically porous skins comprise pores with a diameter, in one form, between 1 and 2 millimeters. The pores do not allow circulating the air in the air layer so as not to bleed air in the flow path. Indeed, the air bleeding in the flow path would decrease the aerodynamic performances of the propulsion unit.

In one form, the sandwich panel is secured to a movable member, in particular movable in rotation, relative to the acoustically reflective wall.

In another form, the sandwich panel is removably fastened to the acoustically reflective wall.

In one form, the acoustically reflective wall comprises at least one partition extending towards the rear skin of the sandwich panel.

In another form, the rear skin of the sandwich panel comprises at least one partition extending towards the acoustically reflective wall.

In a further form, the structure includes at least one seal disposed opposite to the free end of a partition.

In still another form, the sandwich panel includes a plurality of alveolar structures which are separated by an acoustically porous septum.

In one form, the porosity of the rear skin of the sandwich panel is comprised between 1% and 5%.

In another form, the porosity of the front skin of the sandwich panel is comprised between 8% and 20%.

In another form, the air layer has a thickness comprised between 10 and 40 millimeters.

In another form, the alveolar structure has a thickness comprised between 10 and 30 millimeters.

In another form, the rear skin of the sandwich panel includes a truss, in particular a metal truss.

The present disclosure also relates to an aircraft propulsion unit including one or more acoustic attenuation structure(s) in accordance with that defined above.

In one form, the propulsion unit includes a nacelle equipped with a thrust reverser system, the thrust reverser system including at least one blocking flap including the sandwich panel of the acoustic attenuation structure.

In another form, the acoustically reflective wall is formed by a wall of a shroud on which the blocking flap is hinged.

In yet another form, the propulsion unit includes a turbojet engine comprising a fan casing, the fan casing including an inner surface forming the acoustically reflective wall, the sandwich panel being removably fastened to the fan casing.

In a further form, the propulsion unit includes an ejection nozzle, whose inner surface form the acoustically reflective wall, the sandwich panel being removably fastened to the ejection nozzle.

The present disclosure further relates to an aircraft including at least one propulsion unit as defined above.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 4:
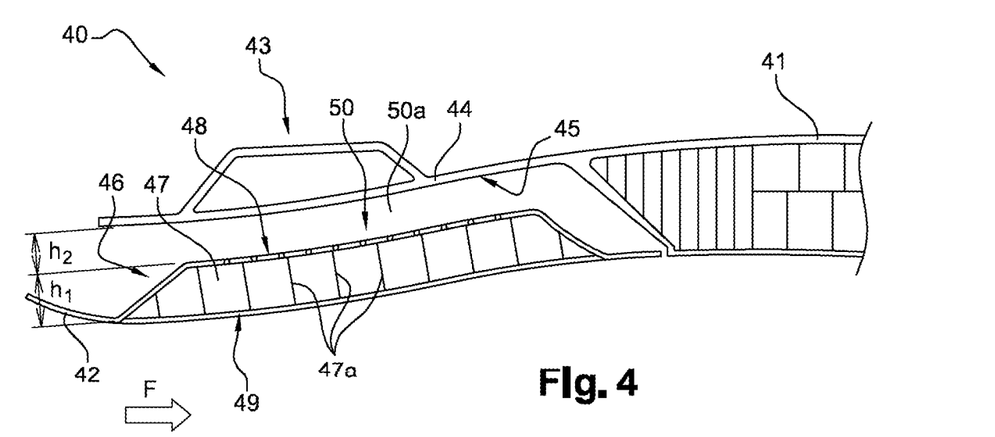
FIG. 4 is a partial sectional view of one variation of a nacelle including an acoustic attenuation structure in accordance with the teachings of the present disclosure.

FIG. 4 shows a partial sectional view of a rear section of a nacelle 40 of bypass turbojet engine. The secondary flow (or cold air flow) flowing through the nacelle when the thrust reverser system is not deployed is shown by the arrow F. The nacelle 40 is for example similar to the nacelle 1 of the FIGS. 1a and 1b. The nacelle 40 thus includes a thrust reverser system, in particular including a movable cowl 41 and a plurality of blocking flaps 42. In FIG. 4, the thrust reverser system is shown in "direct jet" configuration, the movable cowl 41 and the blocking flap 42 therefore being in the retracted position. Thus, the blocking flap 42 is housed within a shroud 43 secured to the movable cowl 41. The shroud 43 includes a solid wall 44 whose inner surface 45, facing the blocking flap 42, is acoustically reflective.

The blocking flap 42 is acoustically processed in accordance with the present disclosure. It thus includes a sandwich panel 46 including an alveolar structure 47 framed between two skins, a rear skin 48 and a front skin 49. The front skin 49 forms the outer surface of the blocking flap 42. The alveolar structure includes in the example a plurality of partitions 47a. The alveolar structure 47 may be formed in known manner by a honeycomb structure.

In accordance with the present disclosure, the two skins 48, 49 framing the alveolar structure 47 are perforated (so as to be acoustically porous). Thus, the sandwich panel 46 forms the first stage of an acoustic attenuation structure with double degree of freedom, the second stage being formed by the space 50 between the inner surface 45 of the shroud 43 and the rear skin 48 of the panel sandwich 46. The acoustic attenuation structure in accordance with the present disclosure therefore includes in the example of FIG. 4 an acoustic skin formed by the front skin 49 and a solid skin formed by the wall 44 of the shroud 43, this wall being solid and is acoustically reflective. Moreover, the rear perforated skin 48 of the sandwich panel 46 forms the septum of the acoustic attenuation structure with double degree of freedom. The height of the second stage (referred to H2 in FIG. 5) will represent between 40% and 80% of the cumulative height of the first (height h1 in FIG. 5) and of the second stage of the structure. The perforation rate of the front skin 49 will be for example comprised between 8% and 20%, while the perforation rate of the rear skin 48 will be for example comprised between 1% and 5%.

The operation principle of the acoustic attenuation structure according to the present disclosure is similar to that of a conventional acoustic attenuation panel with double degree of freedom.

The front skin 49, acoustically porous, is in direct contact with the secondary flow crossing the nacelle (in direct jet mode). The acoustic waves can therefore partially cross the front 49 and the rear 48 skins, both of which are porous. The alveolar structure 47 imposes a planar propagation within the sandwich panel 46. The waves also propagate in the air layer 50a located in the space 50 (or cavity 50) between the shroud 43 and the rear skin 48 of the sandwich panel 46. The waves are reflected by the wall 44 of the shroud 43. Although the cavity 50 of FIG. 4 is not provided with partitions as a conventional alveolar structure, the propagation of the acoustic waves and the acoustic attenuation efficiency are very close to those of a DDOF type acoustic conventional attenuation panel.

The acoustic attenuation structure in accordance with present disclosure includes substantially as a DDOF type panel, while being lighter and less bulky. In addition, we obtain a result equivalent to the known attenuation panels simpler and more economical, since only one sandwich structure (single-stage) is desired.

The present disclosure thus provides numerous gains with respect to the state of the art, and in particular a mass, bulk, economical gain, all at the same acoustic performance.

Figure 5:
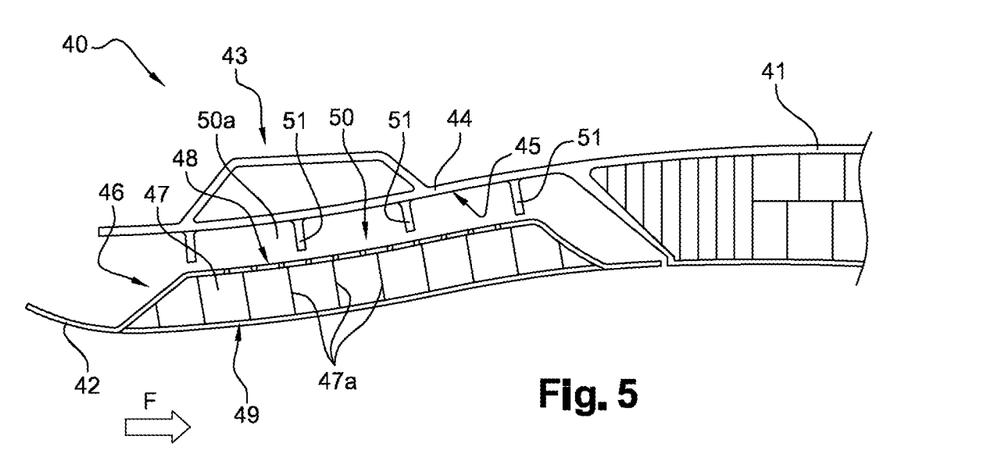
FIG. 5 is a partial sectional view of another variation of a nacelle including an acoustic attenuation structure in accordance with the present disclosure.

In a variant shown in FIG. 5, it possible to provide a plurality of partitions 51 extending from the wall 44 of the shroud 43, towards the rear skin 48 of the sandwich panel 46. Advantageously, the height of the partitions 51 is such that their free end is located in the immediate vicinity of the rear skin 48 of the sandwich panel 46 (for example at a distance comprised of between 1 and 5 millimeters).

The partitions 51 are in the example of FIG. 5 parallel to each other (and also substantially parallel to the partitions of the alveolar structure 47). Alternatively, some of the partitions 51 may also be arranged perpendicularly to each other and/or intersect each other, to form an array of cells.

The partitions 51 allow confining the propagation of the acoustic waves within even the air layer 50a located in the space (or cavity) 50, in order to improve the acoustic attenuation performances of the acoustic attenuation structure in accordance with the present disclosure. In addition, these partitions 51, playing the role of stiffeners, allow improving the mechanical strength of the shroud 6.

Figure 6:
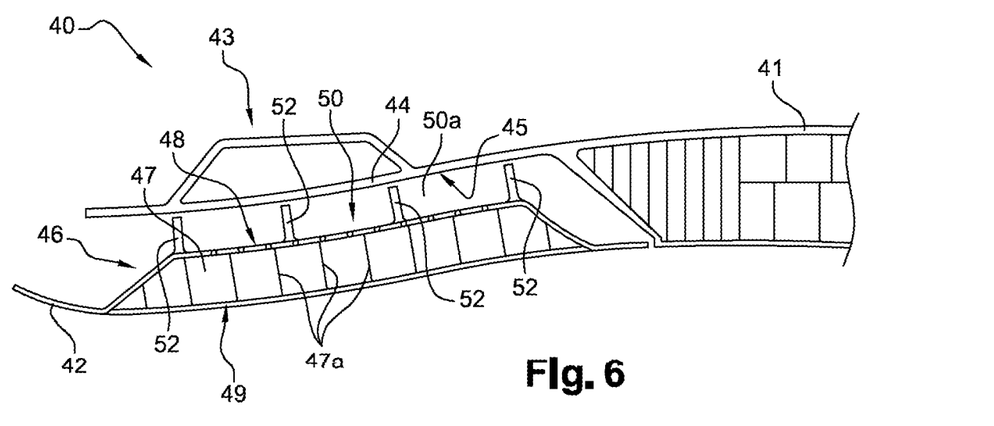
FIG. 6 is a partial sectional view of another variation of a nacelle including an acoustic attenuation structure in accordance with the present disclosure.

In a variant shown in FIG. 6, it is provided that partitions 52 extend from the rear skin 48 of the sandwich panel 46 towards the wall 44 of the shroud 43. Advantageously, the height of the partitions 52 is such that their free end is located in the immediate vicinity of the inner surface 45 of the wall 44 of the shroud 43. Acoustically, the acoustic partitions 53 have a similar effect to that of the partitions 51 of FIG. 5. In addition, the partitions 52, playing the role of stiffeners allowing improving the mechanical strength of the sandwich panel 46 and therefore of the blocking flap 42.

Of course, it is possible to provide at once, partitions 51, extending from the wall 44 of the shroud 43, and partitions 52, extending from the rear skin 48 of the sandwich panel 46.

Figure 7:
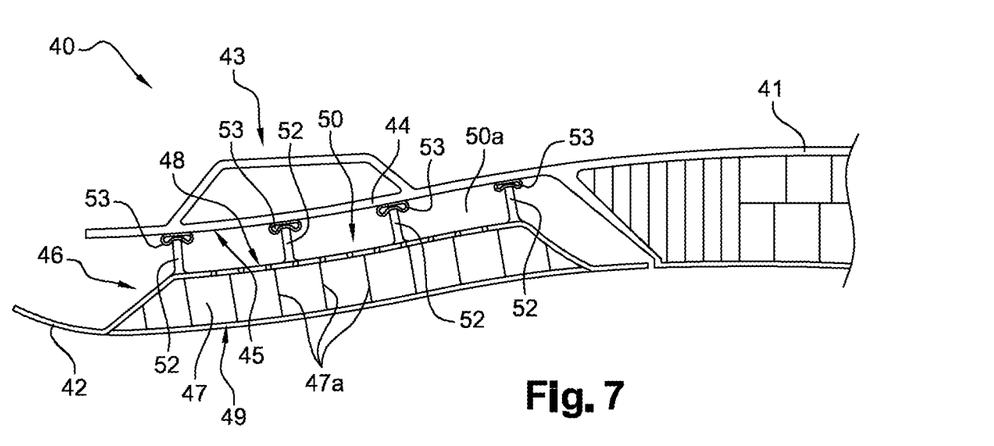
FIG. 7 is a partial sectional view of another variation of a nacelle including an acoustic attenuation structure in accordance with the present disclosure.

In a variant shown in FIG. 7, there is provided, opposite to the free ends of the partitions 52 a network of seals 53 in order to perform the contact and/or the tightness between the shroud 43 and the partitions 52. This results in an improved attenuation of the acoustic waves, these waves being better confined within the air layer 50a located between the inner surface 45 of the shroud 43 and the rear skin 48 of the sandwich panel 46. The use of a flexible material for the seal 53 also allows withstanding the mechanical vibrations between the partitions 52 and the shroud 43.

Of course, the use of seals 53 as shown in FIG. 7 may be adapted to the acoustic attenuation structure of FIG. 5 or to a structure comprising partitions 51, 52 arranged, for some structures, on the shroud 43 and for the others on the sandwich panel 46.

Furthermore, it is possible to provide that the network of seals 53 is fastened directly on the free end of the partitions 51 and/or 52, thus allowing compensating for possible clearance between the partitions 51 and/or 52 and the wall 44 of the shroud 43 or the rear skin 48 of the sandwich panel 46.

Figure 8:
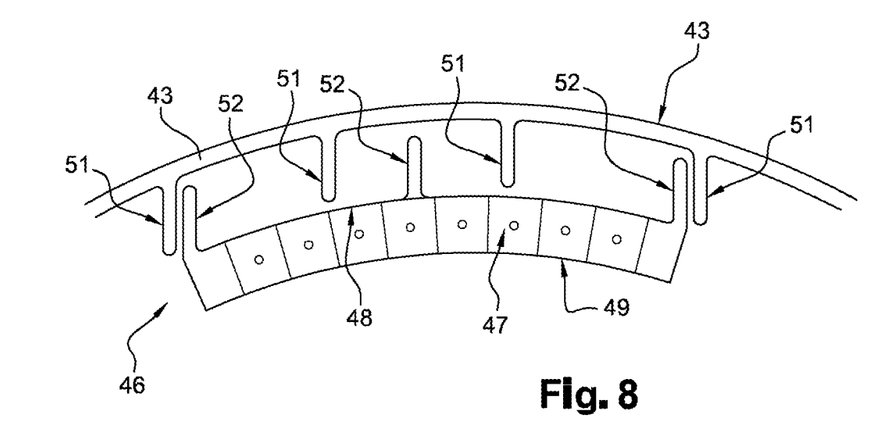
FIG. 8 is a partial sectional view of another variation of a nacelle including an acoustic attenuation structure in accordance with the present disclosure.

FIG. 8 shows one form in which there are provided at the same time partitions 51, extending from the wall 44 of the shroud 43, and partitions 52, extending from the rear skin 48 of the sandwich panel 46. In this example, there is provided that at least some of the partitions 51 of the shroud 43 and the partitions 52 of the sandwich panel 46 are paired, the proximity of two partitions 51, 52 of a pair forming a baffle. The obtained baffle effect allows obtaining a sufficient tightness to avoid the use of seals. More generally, the partitions 51 extending from the shroud 43 and the partitions 52 extending from the rear skin 48 are positioned according to different planes. Thus, the partitions 51, 52 nest inside each other. Such a configuration, in addition to stiffening the shroud 43 and the sandwich panel 46, allows better channeling the waves, while keeping the movability of the flap 42 relative to the shroud 43. In another variant (not shown), the free ends of the partitions 51, 52 are located substantially opposite to each other. This allows establishing points of contact between the two parts, thus defining the distance between the flap 42 and the shroud 43.

Figure 9:
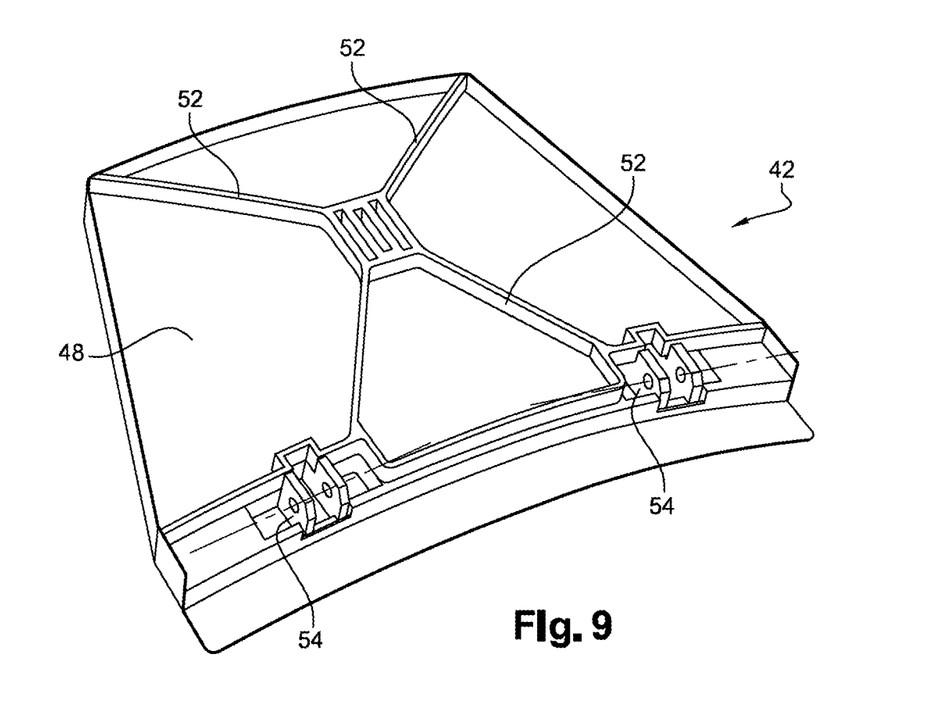
FIG. 9 shows a blocking flap in accordance with the present disclosure.

The acoustic attenuation structures shown in FIGS. 4 to 8 have in common to be formed by the combination of the wall 44 of the shroud 43 and of the sandwich panel 46 of the blocking flap 42. As mentioned above, this blocking flap is movable in rotation, and is hinged to this effect with respect to the shroud 43. FIG. 9 shows an example of blocking flap 42 in accordance with the present disclosure, including in particular a rear perforated skin 48. In the example of FIG. 9, the flap 42 also includes partitions 52 extending from the rear skin 48. In order to be fastened to the shroud 43, the blocking flap 42 includes clevises 54 intended to be associated with fittings or clevises of the shroud 43 (not shown), all of these clevises and fittings being crossed by collinear axes to define the axis of rotation (shown in dot-dash line in FIG. 9) of the flap with respect to the shroud.

Figure 10:
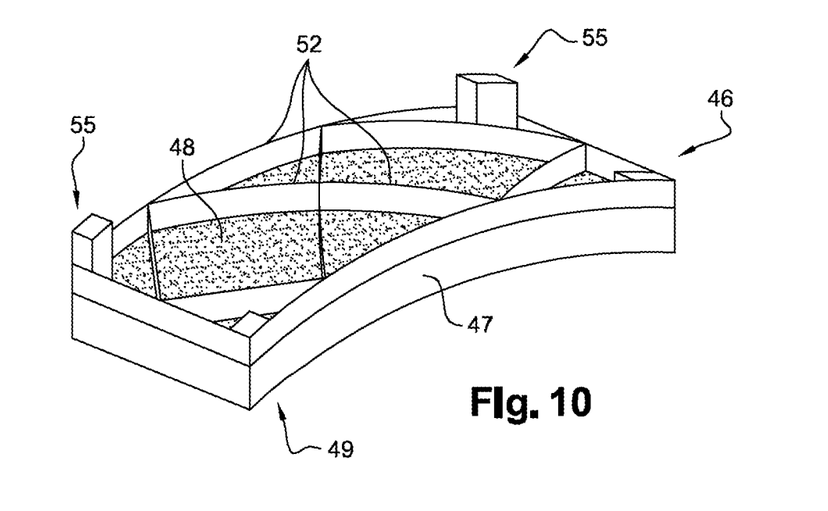
FIG. 10 shows a sandwich panel in accordance with the present disclosure.

Alternatively, it is possible to provide that the acoustic attenuation structure in accordance with the present disclosure does not include movable members. For example, the acoustically reflective wall could be formed by the inner surface of a fan casing or the inner surface of a nozzle, more generally any surface on which it is beneficial to rely to create a sound attenuator with at least two degrees of freedom. In this case, it will be provided that the sandwich panel 46 is fastened to the wall by means of any known removable fastening systems, such as screw-nut assemblies passing from side to side through the two parts and/or screws tightened in threaded inserts, among others. The spacing between the sandwich panel 46 and the acoustically reflective wall, is made for example via fastening blocks 55, as shown in FIG. 10 which fasten the distance between the sandwich panel and the support shroud in order to obtain the desired height of cavity 50.

Moreover, in a non-shown variant, it is possible to provide that the sandwich panel 46 includes several superposed alveolar structures separated from each other by a porous septum, which allows obtaining an acoustic attenuation structure behaving as an acoustic attenuation panel with three degrees of freedom or more.

Advantageously, the rear skin 49 of the sandwich panel 46 may include a structure called linear acoustic structure therefore composed, of a skin with a high porosity (of the order of 30 to 50%) covered with a very thin mesh (metal or organic, or CMO, mesh whose acoustic characteristics are such that the strength after bonding the linear skin is of the order of 30 rayls cgs to 70 rayls cgs).

Figure 11:
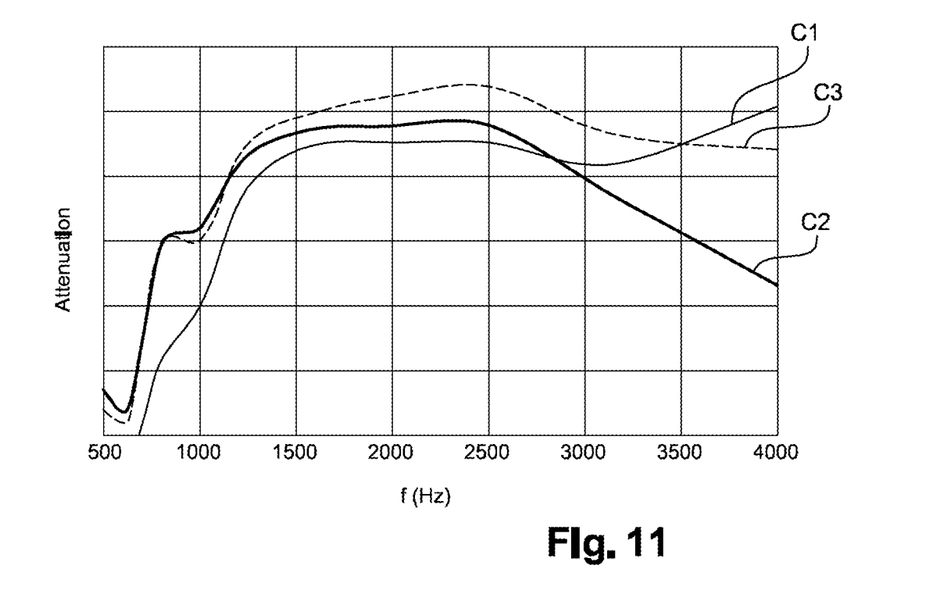
FIG. 11 is a graph illustrating acoustic attenuation performances as a function of frequency for an attenuation structure in accordance with the present disclosure and for two known attenuation structures.

FIG. 11 allows comparing the acoustic attenuation performances obtained with a blocking flap in accordance with the present disclosure (curve C1), with the performances obtained with a similar blocking flap, but equipped with an SDOF type conventional attenuation panel (curve C2), and a similar blocking flap but equipped with a DDOF type conventional attenuation panel (curve C3).

In the diagram of FIG. 11, the rate of attenuation of the acoustic waves is represented as a function of the frequency of the acoustic waves (expressed in Hertz) abscissa.

As shown in FIG. 11, an attenuation structure in accordance with the present disclosure has slightly degraded performance in low-average frequencies (1000 Hz-2500 Hz) relative to a conventional DDOF. However, although there is obtained a typical behavior of a DDOF in higher frequencies (from 3000 Hz), where the solution according to the present disclosure is much more efficient than a conventional SDOF. Thus, an attenuation structure in accordance with the present disclosure allows attenuating the acoustic waves over a much larger bandwidth than a SDOF type panel (referenced curve C2), beyond 2800 Hz in the shown example, and than a DDOF type panel (curve C3) of the state of the art, with a negligible loss of efficiency in low and intermediate frequency (1200 Hz to 2500 Hz in FIG. 11).

Of course, the present disclosure is not limited to an acoustic attenuation structure arranged in a thrust reverser, and a structure in accordance with the present disclosure may be carried out within any adapted member located in a nacelle or a propulsion unit.

It goes without saying that the present disclosure is not limited to the various forms described above as examples but it encompasses all technical equivalents and variants of the means described as well as the combinations thereof.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:
1. An acoustic attenuation structure for an aircraft propulsion unit, the acoustic attenuation structure comprising:
   an acoustically reflective wall; and
   a sandwich panel, the sandwich panel including an alveolar structure framed by a rear and a front acoustically porous skin,
   wherein the sandwich panel is secured to a blocking flap movable in rotation relative to the acoustically reflective wall between a retracted position in which the acoustically reflective wall and the sandwich panel are separated by a non-circulating air layer, and a deployed position in which the non-circulating air layer is removed.

2. The structure according to claim 1, wherein, in the retracted position, the sandwich panel and the non-circulating air layer are disposed between the blocking flap and the acoustically reflective wall, and wherein, in the deployed position, the blocking flap and the sandwich are pivoted away from the acoustically reflective wall.

3. The structure according to claim 1, wherein the sandwich panel is removably fastened to the acoustically reflective wall.

4. The structure according to claim 1, wherein the acoustically reflective wall comprises at least one partition extending towards the rear skin of the sandwich panel.

5. The structure according to claim 1, wherein the rear skin of the sandwich panel comprises at least one partition extending towards the acoustically reflective wall.

6. The structure according to claim 1 further comprising at least one seal disposed opposite to a free end of at least one partition extending towards the rear skin of the sandwich panel or at least one partition extending towards the acoustically reflective wall.

7. The structure according to claim 1, wherein the sandwich panel includes a plurality of alveolar structures separated by an acoustically porous septum.

8. The structure according to claim 1, wherein the porosity of the rear skin of the sandwich panel is between 1% and 5%.

9. The structure according to claim 1, wherein the porosity of the front skin of the sandwich panel is between 8% and 20%.

10. The structure according to claim 1, wherein the non-circulating air layer has a thickness between 10 and 40 millimeters.

11. The structure according to claim 1, wherein the alveolar structure has a thickness between 10 and 30 millimeters.

12. The structure according to claim 1, wherein the rear skin of the sandwich panel includes a truss.

13. The structure according to claim 12, wherein the truss is a metal truss.

14. An aircraft propulsion unit comprising at least one acoustic attenuation structure according to claim 1.

15. The propulsion unit according to claim 14 further comprising a nacelle equipped with a thrust reverser system, the thrust reverser system including at least one blocking flap including the sandwich panel of the acoustic attenuation structure.

16. The propulsion unit according to claim 15, wherein the acoustically reflective wall is formed by a wall of a shroud on which the at least one blocking flap is hinged.

17. The propulsion unit according to claim 14 further comprising a turbojet engine comprising a fan casing, the fan casing including an inner surface forming the acoustically reflective wall, wherein the sandwich panel is removably fastened to the fan casing.

18. The propulsion unit according to claim 14 further comprising an ejection nozzle having an inner surface that forms the acoustically reflective wall, wherein the sandwich panel is removably fastened to the ejection nozzle.

19. An aircraft comprising at least one propulsion unit according to claim 14.

* * * * *